(12) United States Patent
Garrone et al.

(10) Patent No.: US 9,920,852 B2
(45) Date of Patent: Mar. 20, 2018

(54) SUBSEA ELECTRIC ACTUATOR

(71) Applicant: PetrolValves S.r.L., Milan (IT)

(72) Inventors: Marco Garrone, Postua (IT); Ivan Ambrosini, Ardenno (IT); Tiziano Cazzola, Pinarolo Po (IT)

(73) Assignee: PETROLVALVES S.P.A., Milan (IT)

( * ) Notice: Subject to any disclaimer, the term of this patent is extended or adjusted under 35 U.S.C. 154(b) by 0 days.

(21) Appl. No.: 14/809,150

(22) Filed: Jul. 24, 2015

(65) Prior Publication Data
US 2017/0023145 A1    Jan. 26, 2017

(51) Int. Cl.
| | |
|---|---|
| *F16K 31/04* | (2006.01) |
| *F16H 25/22* | (2006.01) |
| *F16H 37/12* | (2006.01) |
| *F16K 37/00* | (2006.01) |
| *F16H 25/20* | (2006.01) |
| *F16H 25/24* | (2006.01) |

(52) U.S. Cl.
CPC ......... *F16K 31/047* (2013.01); *F16H 25/205* (2013.01); *F16H 25/2204* (2013.01); *F16H 37/124* (2013.01); *F16K 31/046* (2013.01); *F16K 37/0041* (2013.01); *F16H 25/2454* (2013.01); *F16H 2025/2087* (2013.01)

(58) Field of Classification Search
CPC .. F16K 31/046; F16K 31/047; F16K 37/0041; F16K 37/0025; F16H 37/124; F16H 25/2204; F16H 2025/2087; F16H 25/205; F16H 25/2454
USPC ....... 251/129.11–129.13, 129.04, 66, 68, 69, 251/71, 74; 74/89.25, 89.26; 137/554
See application file for complete search history.

(56) References Cited

U.S. PATENT DOCUMENTS

| | | | | |
|---|---|---|---|---|
| 4,556,963 A | * | 12/1985 | Hugus ................... | G01V 1/145 116/137 A |
| 5,067,345 A | * | 11/1991 | Mougne ............. | G01N 33/2823 324/664 |
| 5,497,672 A | * | 3/1996 | Appleford ............... | E21B 34/04 185/40 R |

(Continued)

FOREIGN PATENT DOCUMENTS

| | | |
|---|---|---|
| EP | 2916042 A1 | 9/2015 |
| WO | 9300539 A1 | 1/1993 |
| WO | 2006071124 A1 | 7/2006 |
| WO | 2011094084 A1 | 8/2011 |

(Continued)

OTHER PUBLICATIONS

MWM, "Electromagnetic Toothe-Type Couplings", Electromagnetic Brakes Clutches Tooth-Type Couplings Catalogue, 2011, pp. 34-40.

(Continued)

*Primary Examiner* — Ian Paquette
(74) *Attorney, Agent, or Firm* — Corridor Law Group, P.C.

(57) ABSTRACT

A subsea electric actuator includes a housing configured to be filled with dielectric oil, an electric motor, a brake, a clutch, and a spring. The clutch and the brake are configured to maintain the spring in a compressed position. In certain embodiments, the actuator further includes a planetary gear and a multi-turn gear assembly, such that the planetary gear and the multi-turn gear assembly are configured to multiply the torque provided by the electric motor. The actuator can further include a ball screw and a nut screw configured to convert the torque provided by the motor into linear thrust to compress the spring.

19 Claims, 5 Drawing Sheets

(56) References Cited

U.S. PATENT DOCUMENTS

| | | | | |
|---|---|---|---|---|
| 8,342,478 | B1* | 1/2013 | Cordray | F16K 37/0075 |
| | | | | 137/554 |
| 8,464,799 | B2* | 6/2013 | Scott | E21B 34/066 |
| | | | | 166/332.1 |
| 8,636,262 | B2* | 1/2014 | Schade | F16K 31/048 |
| | | | | 251/129.11 |
| 8,973,451 | B2 | 3/2015 | Oswald | |
| 9,458,941 | B2* | 10/2016 | Bohaychuk | F16K 3/246 |
| 2003/0150411 | A1* | 8/2003 | Gohou | F02D 31/001 |
| | | | | 123/65 PE |
| 2011/0308619 | A1* | 12/2011 | Martino | E21B 34/02 |
| | | | | 137/1 |
| 2015/0345602 | A1* | 12/2015 | Funada | F16H 25/2204 |
| | | | | 74/89.23 |
| 2016/0025199 | A1* | 1/2016 | Boone | F16H 25/2204 |
| | | | | 74/89.38 |

FOREIGN PATENT DOCUMENTS

| | | | |
|---|---|---|---|
| WO | 2011110856 A2 | 9/2011 | |
| WO | WO 2011110856 A2 * | 9/2011 | ........... F16K 31/047 |
| WO | 2014069516 A1 | 5/2014 | |
| WO | 2015040476 A1 | 3/2015 | |

OTHER PUBLICATIONS

MWM, "Toothe-Type Spring Loaded Brakes", Electromagnetic Brakes Clutches Tooth-Type Couplings, Catalogue, 2011, p. 53.
International Search Report and Written Opinion dated Mar. 8, 2017, in connection with related International Application No. PCT/EP2016/059900.
International Preliminary Report on Patentability dated Sep. 12, 2017 in connection with International Application No. PCT/EP2016/059900.

* cited by examiner

SUBSEA ELECTRIC ACTUATOR

FIELD OF THE INVENTION

The present invention relates to a method of controlling valves in a subsea environment. In particular the disclosure relates to subsea electric actuators with devices capable of operating the actuator using specific management software.

BACKGROUND OF THE INVENTION

Valves are mechanical components that aid in regulating the flow of material capable of flowing through a pipe, such as a gas or liquid, in order to provide specific pressure or flow rate values. Valves are normally made up of three basic elements, namely:
(1) a body that contains a movable member (a shutter) that connects to the pipes within which the fluid flows;
(2) the shutter that allows the interception of the fluid;
(3) control units, which can be manual, electric or magnetic, that move the shutter.

Valves can be classified by design shape (for example, ball, butterfly, gate valves), by type of operation (for example, manually operated, driven by actuators with electric, pneumatic and hydraulic control) and/or by application (for example, as regulating and shut-off valves).

The control of subsea valves is an important concern of the petroleum industry due to the large expense and risks associated with oil spills. For example, BP (formerly British Petroleum) has had to set aside over forty-three billion dollars to cover fines, legal settlements, and clean-up costs related to a 2010 oil spill in the Gulf of Mexico.

As the exploration for oil and gas moves into deeper waters, the problems and expense associated with such activities will only increase.

Known systems employed for controlling the opening and closing of undersea valves include hydraulic, pneumatic or electro-hydraulic actuators. These actuators typically utilize an externally controlled flow of pressurized hydraulic fluid to drive a piston within the actuator cylinder. This cylinder compresses a spring stack and moves a valve stem to open or close the valve. In a subsea environment, actuators should be manufactured with a fail-resistive closing configuration to prevent or at least severely limit leakage. In an emergency situation, when the valve must be closed quickly, the potential energy stored in a compressed spring is often employed.

Ideally, actuator configurations should entirely prevent the leakage of fluid being controlled. As used herein, the term "fluid-resistive actuators" is meant to encompass not only actuators that prevent leakage, but also actuators that in practice severely limit leakage except to a very small extent.

Traditionally, hydraulic spring return actuators have been employed to move valves in subsea actuators. Hydraulic actuators typically utilize fluid transported through a line extending to the surface, or from an accumulator located on the seabed at or near the well.

Hydraulic actuators suffer a number of disadvantages for subsea applications. As the distance between the actuator and the topside control center increases, the amount of hydraulic fluid needed to fill the lines and operate the valves increases. Over long distances the fluid can lose pressure. Therefore accumulators have to be installed near the actuator to back up the pressure. In addition, the time between a signal being sent from a control center and the actuator responding can be a matter of minutes. In emergency situations this can be too long.

Increases in water depth can also affect actuator performance. The cost and size of hydraulic lines and umbilicals increase with the operational depths and distances.

Existing electric actuators solve some of the problems involved affiliated with hydraulic actuators, however they suffer from their own problems. In particular, as they rely on electric power to open and close the valves, even a short-time power loss prevents existing actuators from closing, which is undesirable and can lead to disastrous consequences in the case of subsea operations.

SUMMARY OF THE INVENTION

Shortcomings of existing subsea electric actuators are overcome by a subsea electric actuator comprising:
(a) a housing configured to be filled with dielectric oil;
(b) an electric motor;
(c) a brake;
(d) a clutch; and
(e) a spring,
in which the clutch and the brake are configured to maintain the spring in a compressed position.

In certain embodiments, the housing is separated into a first cavity and a second cavity. In a preferred embodiment, the housing is made of steel.

In certain embodiments, the present subsea electric actuator further comprises:
(f) a planetary gear; and
(g) a multi-turn gear assembly,
in which the planetary gear and the multi-turn gear assembly are configured to multiply the torque provided by the electric motor.

In certain additional embodiments, the present subsea electric actuator further comprises:
(h) a ball screw; and
(i) a nut screw,
in which the ball screw and the nut screw are configured to convert the torque provided by the motor into linear thrust to compress the spring.

In certain additional embodiments, the present subsea electric actuator further comprises:
(j) a damper configured to regulate the closing speed of a valve.

In the present subsea electric actuator, the damper can be configured to displace the dielectric oil to a flow regulating orifice.

In certain additional embodiments, the present subsea electric actuator further comprises:
(j) a central processing unit (CPU) configured to monitor an at least one aspect of the subsea electric actuator.

In certain additional embodiments, the present subsea electric actuator further comprises:
(k) a position indicator sensor configured to verify the position of a valve.

In certain alternative embodiments, the present subsea electric actuator further comprises:
(k) a water presence sensor for monitoring the presence of water in the dielectric oil.

In certain alternative embodiments, the present subsea electric actuator further comprises:
(k) a load cell.

In the present subsea electric actuator, the load cell can comprise a plurality of (preferably four) strain gages configured to monitor the performance of the subsea electric actuator.

In certain alternative embodiments, the present subsea electric actuator further comprises:
(k) a motor driver.

In certain alternative embodiments, the present subsea electric actuator further comprises:
(k) a compensator configured to balance the internal pressure of the subsea electric actuator with an exterior pressure.

In certain alternative embodiments, the present subsea electric actuator further comprises:
(k) a shock absorber.

In certain alternative embodiments, the present subsea electric actuator further comprises:
(k) a safety valve configured to discharge overpressure in the housing to an external environment.

In certain alternative embodiments, the present subsea electric actuator further comprises:
(k) a position indicator configured to display via a physical indication the position of a valve.

In the present subsea electric actuator, the clutch can be engaged to move a valve by the motor if the spring fails. The CPU can be configured to monitor at least one of dynamic thrust, speed, position, and acceleration of the actuator stroking output.

The present subsea electric actuator can also be configured to be able to undergo a partial stroking test in order to verify the spring is operating properly.

The present subsea electric actuator, which includes a spring-return, can perform emergency shut down services of pipelines. When a fail-resistive operation is requested, the actuator closes to stop the downstream flow. The present electric actuator reduces the overall operation costs since hydraulic power units (HPU) and umbilicals are not required. The present electric actuator also avoids, or at least severely limits, leakages of hydraulic oil, reduces total power consumption, and allows for the installation of valves in water depths unreachable by conventional actuators.

In addition, the electric actuator allows for diagnostic coverage such as measuring and recording valve and spring thrust/torque, water presence in the dielectric oil, and valve position monitoring. This diagnostic coverage can detect many system failures that escape detection on a hydraulic actuator.

The electric actuator improves the reliability and availability of the system resulting in a higher Safety Integrated Level (SIL) defined by European standards 61508 and 61511, of the International Electro technical Commission (IEC), as a "relative level of functional risk-reduction". SIL represents the calculation of the probabilities that actuators and valves will not be damaged within a certain time (probability of failure-per-hour "ph."). Therefore, the greater the SIL index, from a minimum of SIL 1 to a maximum of SIL 4, the lower the failure rate.

DETAILED DESCRIPTION OF ILLUSTRATIVE EMBODIMENT(S)

Figure 1:
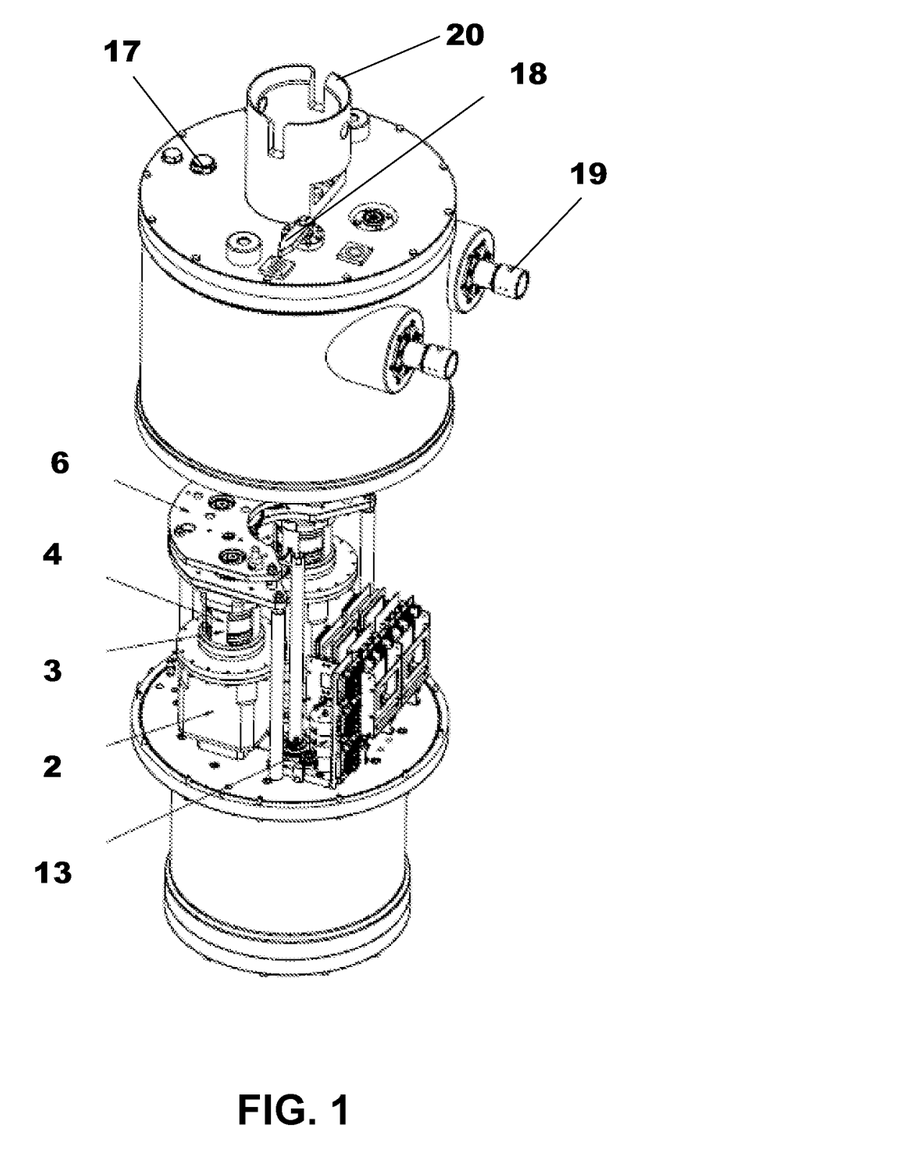
FIG. 1 is a perspective view of an electric actuator.
Figure 2:
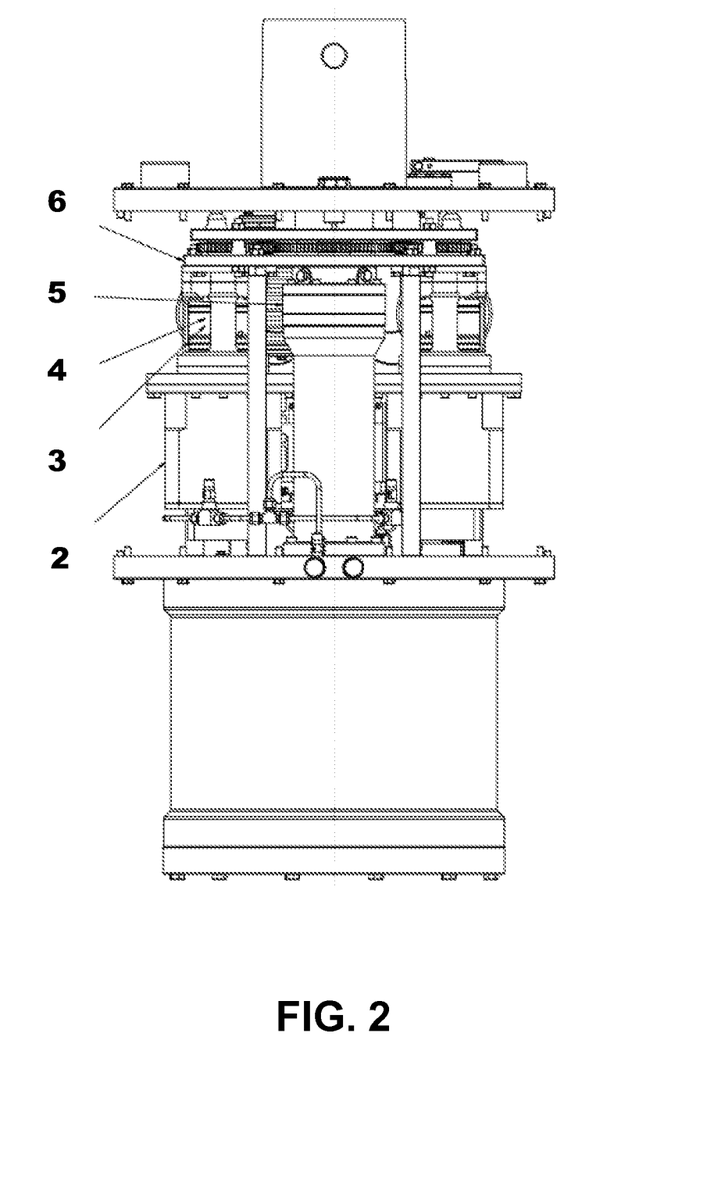
FIG. 2 is a front view of an electric actuator.

Turing to FIG. 1 subsea electric actuator 100 includes housing 1 (see FIG. 3) which can be filled with dielectric oil (compensating oil). Dielectric oil is employed to balance the exterior pressure with the interior pressure. In some embodiments, housing 1 can be separated into separate cavities that can be filled with various dielectric oils and/or water-based fluids. In some embodiments subsea electric actuator 100 is made of steel.

Subsea electric actuator 100 includes electric motor 2 that generates the torque used to move the valve and/or valves (not shown). In some embodiments subsea electric actuator 100 includes additional motor(s) 2. In embodiments with more than one motor 2, motors 2 can be in redundant configuration. In certain embodiments motors 2 are in triple modular redundancy.

Subsea electric actuator 100 can include brake 3 and clutch 4 that are configured to keep spring 9 (see FIG. 3) of subsea electric actuator 100 in a compressed position and allow for actuator 100 to fail-resistive to a closed position. In certain embodiments motor 2 is used to compress spring 9.

In some embodiments, planetary gear 5 and multi-turn gear assembly 6 are configured to multiply the torque provided by the rotary motion of the motor shaft of motor 2. In other or the same embodiments, ball screw 7 (see FIG. 3.) and nut screw 8 (see FIG. 3) are configured to convert the torque provided by motor 2 into a linear thrust that moves the valve (not shown) and compresses spring 9 (see FIG. 3) into a compressed position.

Figure 3:
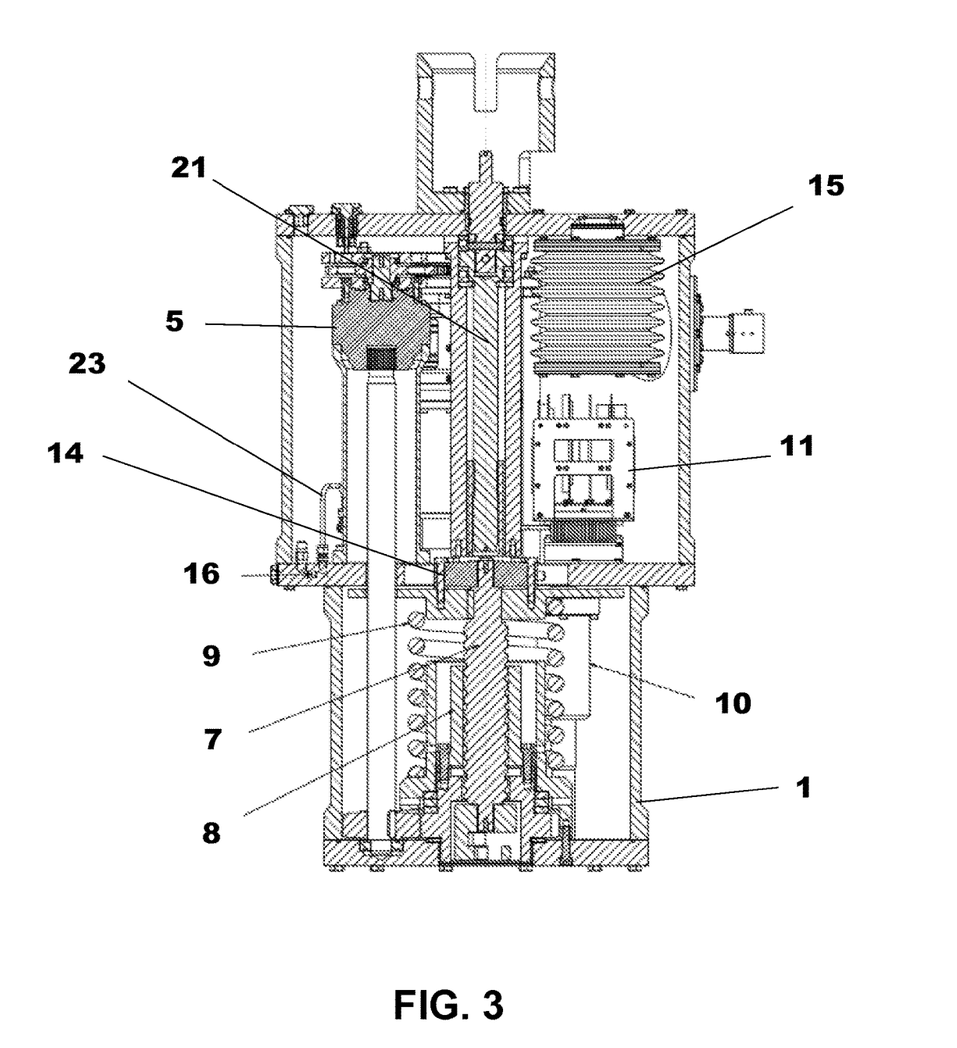
FIG. 3 is cutaway front view of an electric actuator.

When spring 9 of subsea electric actuator 100 reaches a compressed position brake 3 and clutch 4 are engaged to keep spring 9 in the compressed position. Clutch 4 is used to maintain spring 9 in the compressed position with potential energy that can be released to move spring 9 into a fail-resistive position when clutch 4 is disengaged. In some embodiments spring 9 is help in place by an electro magnet which is dis-energized in the event of an emergency shutdown.

To regulate the closing speed of the valves, subsea electric actuator 100 can be equipped with damper 10. Damper 10 can be selected based on the various temperature and/or pressure it will be exposed to. Damper 10 displaces oil to flow regulating orifice 16 in order to generate the required or desired drop of pressure in damper hydraulic circuit 23. In some embodiments damper 10 is made of a rust-proof or rust-resistant material.

Dynamic thrust, speed, position, and acceleration of the actuator stroking output can be recorded, monitored and compared over time, for valve and actuator conditions diagnostic and troubleshooting procedures. In some embodiments it is possible to perform partial stroking tests in order to verify that spring 9 and other various components of the valve/actuator mechanism are working properly. In some embodiments the partial stroking tests involve partially closing and reopening actuator.

Figure 4:
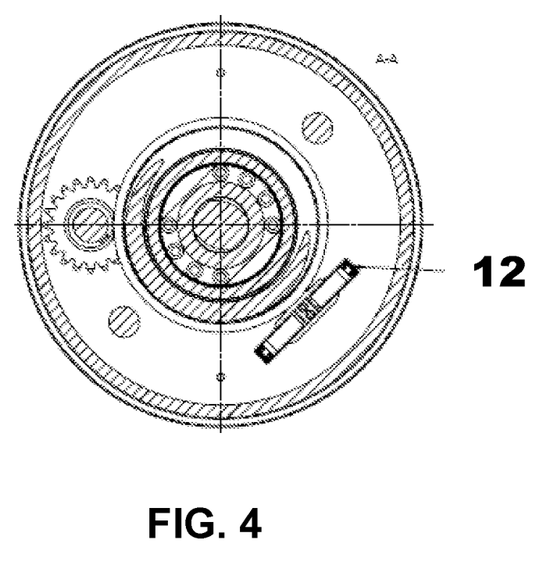
FIG. 4 is cutaway top view of an electric actuator.

Motor 2 is driven by motor driver 11 and various sensors such as, but not limited to, water presence sensor 12 (see FIG. 4), position indicator 13, and load cell 14 (see FIG. 3) that can be wired to diagnostic CPU 22 (not shown) which monitors subsea electric actuator 100.

Water presence sensor(s) 12 monitors whether water is present in the dielectric oil. Position indicator sensor(s) 13 verify the position of the valve subsea electric actuator 100. Load cell 14, which in some embodiments includes four strain gages (not shown) in order to allow the logic 2oo3, continuously monitors the performance of the valves and actuator 100. Water presence sensor 12, position indicator sensor 13 and load cell 14 can all be in redundant configuration.

In some embodiments subsea electric actuator 100 is equipped with compensator 15 to balance the internal pressure of the subsea electric actuator with the environmental or exterior pressure. In these embodiments the various electronics can work in dielectric oil under pressure. In at least some embodiments the various electronics are essentially free of air pockets, "solid state".

An electronic communication card or medium inside CPU 22 provides instructions for actuator operation to electric motor 2. Torque is transferred to multi-turn gear assembly 6 and planetary gear 5 which multiplies the torque. The torque is then transferred to ball screw 7 and nut screws 8.

In some embodiments, the CPU consists of a motherboard, power board, control board, and a drive board. A remote hardware and software system can allow monitoring the amounts of fluids in transit through the opening modulation of the valves, conduct diagnoses and statistics, or manage the functions of the actuator 100 and consequently the related subsea valve(s).

The components of subsea electric actuator 100, including the electronics, can be in redundant configuration. In some embodiments, the components can be in double modular redundancy, triple modular redundancy, and/or a combination of the two.

In some embodiments, a shock absorber with elastic meshes is inserted, interposed between motor 2 and various electronic components. In some embodiments, the elastic meshes are made of stainless steel. The shock absorber can protect the various electronic components by absorbing shocks and vibrations that may arise during the operation of motor 2. In some embodiments, the shock absorber can dampen down and deflect more than forty percent of the frequencies of stress between five and twenty five Hertz.

In instances when spring 9 fails, clutch 4 can be engaged to move the valve to the closed position with electric motor 2. In some embodiments, clutch 4 can be moved manually. Actuators with this feature are able to receive a high Safety Integrated Level (SIL) since failure of spring 9 alone does not jeopardize proper operation of subsea electric actuator 100. With sensors it is also possible increase the actuator diagnostic coverage to increase reliability of the system.

In some embodiments, safety valve(s) 17 provide for the discharge of overpressure in the actuator's internal housing to external environments such as the sea.

In certain embodiments, subsea electric actuator 100 includes position indicator 18. Position indicator 18 can include physical indication (such as a movable arrow) which indicates the position of the valve. Position indicator can be utilized by a remotely operated valve (ROV) vehicle manipulator and/or monitored via a camera.

In certain embodiments, electric connectors 19 are employed for signal and power supply. In other or the same embodiments, remotely operated valve (ROV) override 20 is present. ROV override 20 is configured to push down spring 9 and ball screw 7 by screw-nut mechanism 21. In at least some embodiments, ROV override is operated by a ROV vehicle manipulator.

Figure 5:
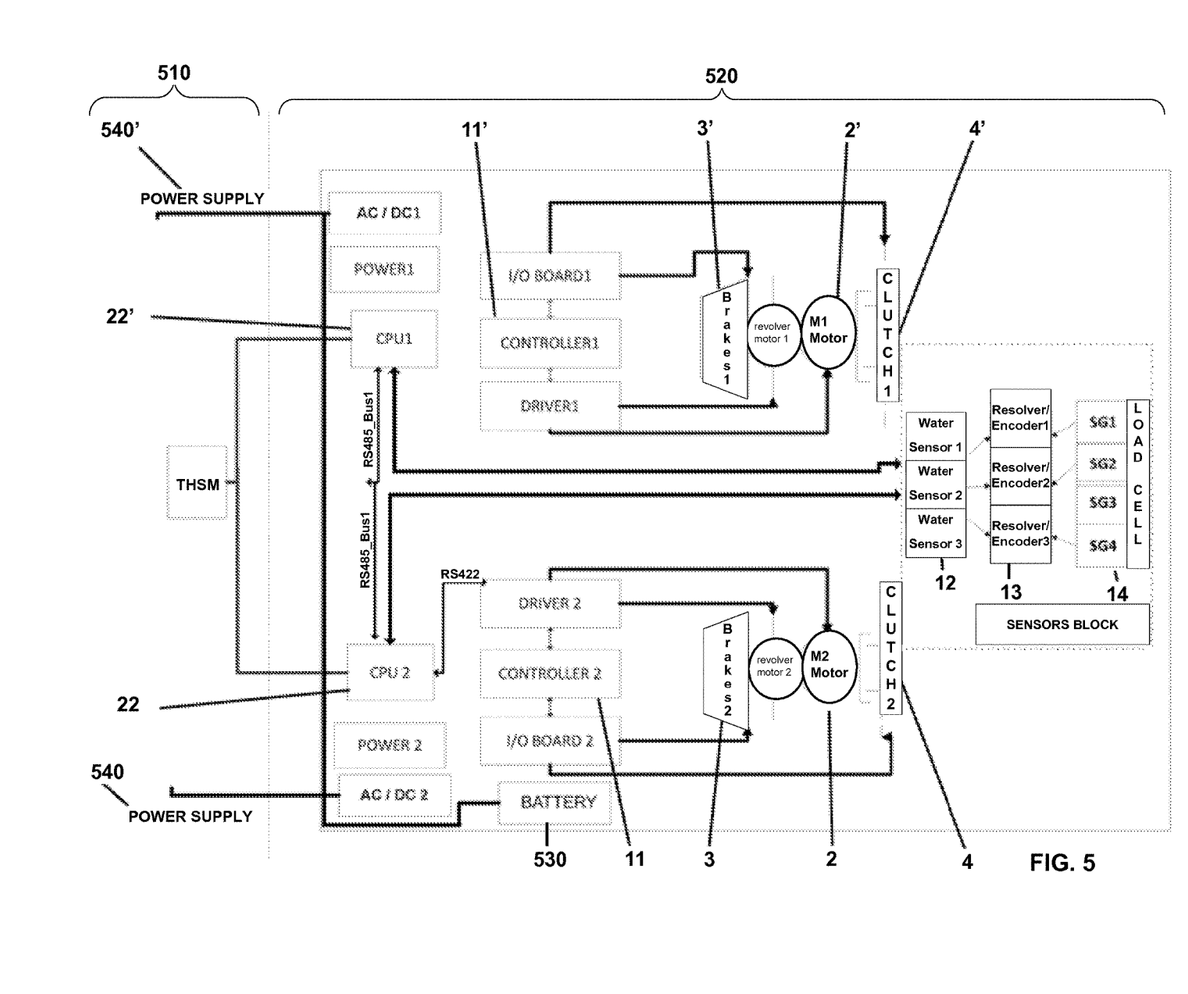
FIG. 5 is a schematic drawing of a system comprising an electrical supply and control system and the actuator shown in FIG. 1.

Turning to FIG. 5, a schematic of an electric supply and control system of actuator 100 is shown. In the embodiments shown components in section 510 are located topside, while components 520 are located subsea. To increase reliability, the various components are shown in redundant configuration. Power supply 540 and 540' are located topside to run the various components of actuator 100. In some embodiments, optional battery 530 is located subsea in case power from power supply 540 and/or 540' is lost. This increases the reliability and safety of actuator 100. In certain embodiments, battery 530 can be located topside.

CPU 22 and 22' monitor subsea electronic actuator 100 and its various components, including but not limited to, motor drivers 11 and 11', brakes 3 and 3', motor 2 and 2', clutch 4 and 4', water presence sensor 12, position indicator 13, and load cell 14.

The above described embodiments can be used individually or in various suitable combinations.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:
1. A subsea electric actuator comprising:
(a) a housing configured to be filled with dielectric oil;
(b) a first electric motor;
(c) a first brake associated with said first electric motor;
(d) a first clutch associated with said first electric motor;
(e) a second electric motor;
(f) a second brake associated with said second electric motor;
(g) a second clutch associated with said second electric motor;
(h) a multi-turn gear assembly operably connected to said first clutch and said second clutch;
(i) a spring;
(j) a ball screw and a nut screw operably connected with a planetary gear and configured to convert the torque provided by said first electric motor or said second electric motor into a linear thrust to compress said spring; and
(k) said planetary gear configured to interact with said multi-turn gear and multiply said torque provided by said first electric motor or said second electric motor via said first clutch or said second clutch,
when said first clutch and said second clutch are in an engaged condition said first clutch, said second clutch, said first brake, and said second brake are configured to maintain said spring in a compressed position,
and wherein said second electric motor is redundant to said first electric motor.

2. The subsea electric actuator of claim 1, wherein said housing is separated into a first cavity and a second cavity.

3. The subsea electric actuator of claim 1, wherein said housing is made of steel.

4. The subsea electric actuator of claim 1, wherein said first clutch is configured to move a valve by said first motor when said spring fails.

5. The subsea electric actuator of claim 1, wherein said first electric motor and said second electric motor are symmetrically arranged in parallel relative to said planetary gear.

6. The subsea electric actuator of claim 1, further comprising:
(l) a damper configured to regulate the closing speed of a valve.

7. The subsea electric actuator of claim 6, wherein said damper is configured to displace said dielectric oil to a flow regulating orifice.

8. The subsea electric actuator of claim 1, further comprising:
(l) a CPU configured to monitor an at least one aspect of said subsea electric actuator.

9. The subsea electric actuator of claim 8, further comprising:
(m) a position indicator sensor configured to verify the position of a valve.

10. The subsea electric actuator of claim 8, further comprising:
(m) a water presence sensor for monitoring the presence of water in said dielectric oil.

11. The subsea electric actuator of claim 8, further comprising:
(m) a motor driver.

12. The subsea electric actuator of claim 8, further comprising:
(m) a compensator configured to balance the internal pressure of said subsea electric actuator with an exterior pressure.

13. The subsea electric actuator of claim 8, further comprising:
(m) a shock absorber.

14. The subsea electric actuator of claim 8, further comprising:
(m) a safety valve configured to discharge overpressure in said housing to an external environment.

15. The subsea electric actuator of claim 8, further comprising:
(m) a position indicator configured to display via a physical indication the position of a valve.

16. The subsea electric actuator of claim 8, wherein said CPU is configured to monitor one of dynamic thrust, speed, position, and acceleration of the actuator stroking output.

17. The subsea electric actuator of claim 8, wherein said subsea electric actuator is configured to undergo a partial stroking test in order to verify that said spring is operating properly.

18. The subsea electric actuator of claim 8, further comprising:
(m) a load cell.

19. The subsea electric actuator of claim 18, wherein said load cell comprises a plurality of strain gages configured to monitor the performance of said subsea electric actuator.

* * * * *